US008638915B2

(12) United States Patent
O'Neil et al.

(10) Patent No.: US 8,638,915 B2
(45) Date of Patent: *Jan. 28, 2014

(54) RATING COMMUNICATIONS AND SPECIAL COMMUNITIES

(75) Inventors: Douglas Rutherford O'Neil, Marietta, GA (US); Stephen Kenneth Sherman, Alpharetta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 86 days.

This patent is subject to a terminal disclaimer.

(21) Appl. No.: 13/297,177

(22) Filed: Nov. 15, 2011

(65) Prior Publication Data

US 2012/0066103 A1    Mar. 15, 2012

Related U.S. Application Data

(63) Continuation of application No. 11/595,233, filed on Nov. 10, 2006, now Pat. No. 8,073,117.

(51) Int. Cl.
*H04M 15/00* (2006.01)
*H04M 11/00* (2006.01)

(52) U.S. Cl.
USPC ............... 379/114.05; 379/121.02; 455/406

(58) Field of Classification Search
USPC ............ 379/114.01, 114.03, 114.05, 114.12, 379/114.21, 114.23, 114.26, 115.01, 379/121.02, 127.03, 127.05; 455/405–408
See application file for complete search history.

(56) References Cited

U.S. PATENT DOCUMENTS

| | | | |
|---|---|---|---|
| 5,950,174 A | 9/1999 | Brendzel | |
| 6,023,500 A | 2/2000 | Kearns et al. | |
| 6,052,447 A | 4/2000 | Golden et al. | |
| 7,606,354 B2 | 10/2009 | Meincke | |
| 7,826,421 B2 * | 11/2010 | Pousti et al. | 370/329 |
| 7,831,027 B2 | 11/2010 | Cesarini et al. | |
| 7,873,152 B1 | 1/2011 | Patro | |
| 8,073,117 B2 | 12/2011 | O'Neil et al. | |
| 2004/0224661 A1 | 11/2004 | Pericas et al. | |
| 2006/0276171 A1 * | 12/2006 | Pousti | 455/405 |
| 2007/0002830 A1 * | 1/2007 | Beckemeyer | 370/352 |

\* cited by examiner

*Primary Examiner* — Binh Tieu (57) ABSTRACT

A number of communication entities can be associated to provide one or more special communities. A special rating can be applied to certain communication events of users associated with a special community. Users associated with a special community can be offered various services if they have subscribed to one or more plans. A user who has subscribed to a special community can communicate with other users of the same network or a different network who are also part of the special community for a special charge, such as without charge for example.

20 Claims, 3 Drawing Sheets

RATING COMMUNICATIONS AND SPECIAL COMMUNITIES

This application is a continuation of U.S. patent application Ser. No. 11/595,233, filed Nov. 10, 2006, now U.S. Pat. No. 8,073,117 B2, which is herein incorporated by reference in its entirety.

BACKGROUND

In today's economy, companies continually look for ways to generate revenue and increase productivity without increasing the cost of day-to-day operations. It has become common business practice for companies to merge or otherwise acquire other business units in order to streamline, eliminate competitors, and offer diversified services. By diversifying and consolidating, a company may be more competitive in the marketplace. However, as companies consolidate, integration issues can become paramount. For example, each company will most likely have different systems and associated components e.g. network, billing, record maintenance, etc. and other infrastructure which may not mesh with the other system(s) and infrastructure. Correspondingly, each company must become familiar with the different systems in order for the consolidation to be successful.

Likewise, consumers have different opportunities when selecting a company for one or more services. For example, consumers can select from multiple mobile and conventional phone providers for phone services. When deciding to change from one provider to another, it is not uncommon for a consumer to request the assignment of the prior phone number for the new service. This prevents the consumer from the hassle of having to contact all of the various contacts to communicate a changed phone number. A new service provider can appease a new customer by allowing the customer to maintain the same contact information for a new service. However, the consumer appetite seems to be insatiable, and companies continue to look for ways to attract new customers while maintaining goodwill with existing customers.

SUMMARY

Embodiments are directed to rating communications, including applying a special rating to certain communication events. In an embodiment, a number of communication entities can be associated to provide one or more special communities. Users associated with a special community can be offered various services, wherein each special community can provide one or more different services. A user who has subscribed to a special community can communicate with other users of the same network or a different network who are also part of the special community for a special charge. In an embodiment, a special identifier can be assessed and used to rate and bill a communication event, wherein the special identifier can be used to indicate whether a user belongs to a special community.

These and other features, which characterize the present invention, will be apparent from a reading of the following detailed description and a review of the associated drawings. It is to be understood that both the foregoing general description and the following detailed description are exemplary and explanatory only and are not restrictive of the invention as claimed.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

DETAILED DESCRIPTION

As briefly described above, embodiments are directed to rating communications, including applying a special rating to certain communication events. In an embodiment, a number of communication entities can be associated to provide one or more special communities. For example, a number of communication carriers can form an alliance of carriers having disparate communication networks, components, and/or associated systems. Users associated with a special community can be offered various services if they have subscribed to one or more plans, including a special community plan. In one embodiment, a user can subscribe to one or more special communities, wherein each special community provides certain services and associated benefits to the user. In an embodiment, a special identifier can be assessed and used to rate and bill a communication event, wherein the special identifier can be used to indicate whether a user belongs to a special community.

In the following description, numerous specific details are introduced to provide a thorough understanding of, and enabling description for, embodiments of the invention. One skilled in the relevant art, however, will recognize that the invention can be practiced without one or more of the specific details, or with other components, systems, etc. In other instances, well-known structures or operations are not shown, or are not described in detail, to avoid obscuring aspects of the invention.

Figure 1:
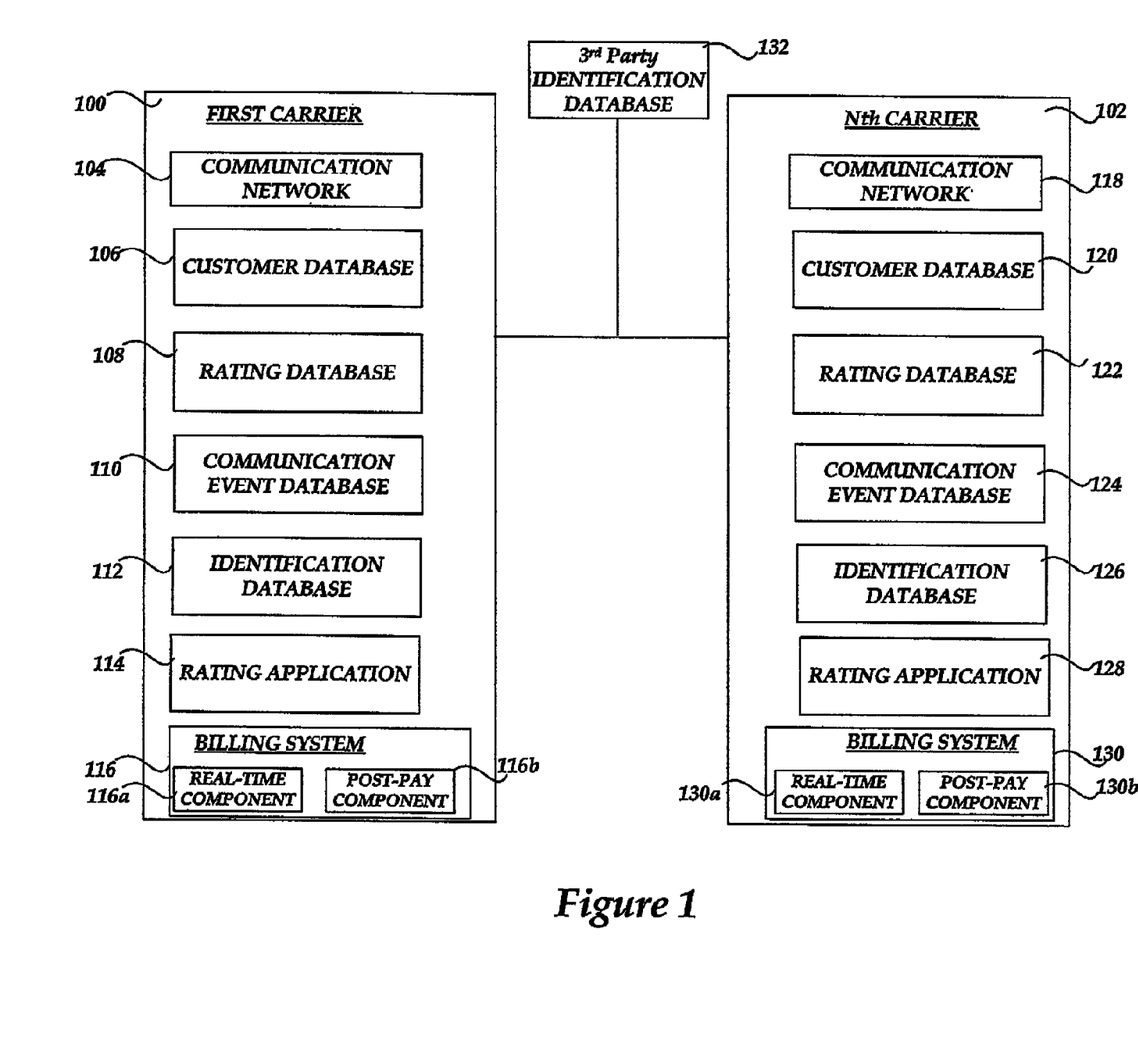
FIG. 1 illustrates a block diagram of a number of communication carriers.

FIG. 1 is a block diagram of a number of communication carriers that are associated to provide one or more services to customers or users that have subscribed to services associated with one or more of the communication carriers under an embodiment. As shown in FIG. 1, there are a number of communication carriers which include a first carrier 100 and a Nth carrier 102. The Nth carrier 102 can represent a second carrier or a last carrier of any number of carriers.

The communication carriers 100 and 102 can be configured to provide a number of services to subscribers. For example, the first carrier 100 can comprise a service provider that provides various services, such as wireless device, wired device, Internet, video, audio, data, gaming, and other services to subscribers. Likewise, the Nth carrier 102 can comprise a service provider that provides various services, such as fixed telephone, mobile telephone, Internet, broadband, VoIP, video, audio, data, gaming, and other services to subscribers.

In one embodiment, the first carrier 100 and Nth carrier 102 comprise distinct communication networks and provide different services. The communication carriers 100 and 102 can be combined together to provide a special community and offer a greater number of services to subscribers associated therewith. For example, the first carrier 100 may provide mobile telephone services, while the Nth carrier 102 provides landline telephone services. The combination of carriers can provide more services to subscribers associated therewith. Moreover, a special community rating and billing can be applied to communication events of users associated with a combination of carriers.

In an embodiment, subscribers of one or more carriers can be given a preferential rating treatment for billing purposes depending on various parameters associated with a communication event. For example, the first carrier 100 and the Nth carrier 102 can partner together to define a special community, wherein users associated with the special community are given preferential ratings for communication events made between users of the special community. As used herein, a communication event can include any type of signal communication including, but not limited to: wireless, wired, voice, data, video, broadband, audio, combinations thereof, and/or other types of communications.

As described below, each carrier can include a rating application. The rating application can be used to determine whether a communication event deserves a preferential rating, wherein the preferential rating can be associated with a special community. In an embodiment, the rating application can be used to rate communications including wired, wireless, and other communications. For example, the rating application can be used to rate local residential service communications, local small business service communications, long distance communications, mobile communications, internet communications, video communications, data communications, and other communications.

With continuing reference to FIG. 1, the first carrier 100 includes an associated communication network 104 which the first carrier 100 may own or lease. The communication network 104 can comprise any communication network capable of communicating information, including wired, wireless, and other communications. For example, the communications network 104 can provide services to a number of communications devices for communicating voice, data, and other communications with one or more switching devices, such as a standard central office circuit switch and/or a softswitch for routing voice and data traffic.

The first carrier 100 also maintains a customer database 106. The customer database 106 is a repository for customer information associated with the first carrier 100. The customer information can include, but is not limited to: type of service plan(s) (voice, data, video, etc), service features, contact information, billing information, phone number(s), IP address, etc. The customer database 106 includes a number of customer data records (CDRs), wherein each CDR is associated with a customer of the first carrier 100 and contains information associated therewith.

In an embodiment, the customer database 106 includes a special identifier, such as a value of a specific database field for example, that can be used to identify whether a particular customer is associated with a special community. The special identifier can comprise a range of values, wherein each value can be associated with a distinct special community and/or rating. A first value can be associated with a first special community and/or rating, wherein customers associated with the first special community obtain certain benefits (e.g. a first distinct charge for a communication event) when communicating with others that are associated with the first special community. For example, if a customer belongs to the first special community and makes a mobile phone communication to another customer of a different network (or the same network) that also belongs to the first special community, then each customer will not be charged for the particular communication transaction (other than a monthly billing charge for the service for example). In other words, each customer will not be charged for the particular communication event since they each belong to the special community.

Likewise, a second value can be associated with a second special community, wherein customers associated with the second special community obtain certain benefits (e.g. a second distinct charge for a communication event) when communicating with others that are associated with the second special community, and so on. Correspondingly, the special communities can be associated with customers of each carrier and/or communication network, wherein a number of carriers and/or networks can define each special community. Each special community can also include customers across disparate carrier networks who have signed up for similar services (quad play bundle services for example) with the associated carrier. In an embodiment, the customer database 106 can include a plurality of such identifiers, wherein each identifier can be associated with a distinct special community.

The following table illustrates a number of special identifier values, special communities, ratings, and charges under an embodiment.

TABLE

| Special Identifier Value | Special Community | Rating | Charge |
|---|---|---|---|
| 0 | A | 0 | 0 |
| 1 | B | 1 | 50% |
| 2 | C | 2 | 75% |
| 3 | D | 3 | 100% |

As shown in the Table above, a special identifier value of "0" identifies a special community "A." Users in the special community A receive a "0" rating and an associated zero charge. A special identifier value of "1" identifies a special community "B." Users in the special community B receive a "1" rating and an associated charge of fifty percent of the normal charge. A special identifier value of "2" identifies a special community "C." Users in the special community C receive a "2" rating and an associated charge of seventy-five percent of the normal charge. A special identifier value of "3" identifies a special community "D." Users in the special community D receive a "3" rating and an associated charge of one hundred percent of the normal charge per event or other like-monthly charges and free minutes.

With continuing reference to FIG. 1, the first carrier 100 also maintains a rating database 108. The rating database 108 includes rating information associated with each service plan provided by the first carrier 100. As described below, the rating database 108 can include a number of rating tables for use in rating a communication event by a rating application 114. That is, the rating application 114 can access rating tables in the rating database 108 to ascertain how to rate a communication event. The rating tables of the rating database 108 can also include rating information for rating a communication event associated with a special community. In one embodiment, the rating tables include one or more special identifiers for use in rating a communication event. The special identifiers can be accessed and evaluated in real-time to determine how a particular communication event should be rated.

The first carrier 100 also maintains a communication event database 110. The communication event database 110 can comprise communication event information collected and/or associated with various devices of one or more communication networks. The communication event database 110 can include information such as, but not limited to: event origination information, event termination/destination information, date/time, duration, System ID, special community identifier, etc. The communication event database 110 can be accessed to determine information associated with a communication event, such as a call, data transfer, video download, etc. For example, the communication event database can include communication transaction records that include origination information, termination/destination information, timestamps, an amount of time associated with the communication transaction, transaction content, and/or other transaction/event information. As described below, the rating application 114 uses information of the communication event database 110 to rate a communication event.

In an embodiment, the first carrier 100 can maintain the communication event database 110 which includes a signal propagation database that contains information associated with the communication of electronic signals made by customers associated with the first carrier 100. The electronic signal database can include signal propagation records which include information such as an origination address, termination/destination address, packet size, transit duration, encryption information, etc. collected by one or more signal monitoring devices.

The first carrier 100 can also maintain a communication event database 110 that includes a call record database that contains information associated with calls made by customers associated with the first carrier 100. The call record database includes call records which include information collected by one or more switching devices. The call record information can include an originating number, automatic number identifier (ANI), termination/destination number, starting and ending timestamps, call duration, location of the originating and receiving parties, etc. As described above, the communication event database 110 can include all communication events associated with customers of the first carrier 100. Accordingly, the examples and embodiments described herein are not intended to limit the information capable of being captured and stored in the communication event database 110.

The first carrier 100 also maintains an identification database 112. The identification database 112 includes identification information and other knowledge associated with carriers/networks of interest, but is not so limited. As user information changes, the identification database 112 can be updated in real-time to include any changed information, such as whether a user has become a member of or left a special community for example. The rating application 114 can also use the information contained in the identification database 112 to determine if a party to a communication event should be rated as part of a special community.

In one embodiment, the identification database 112 can be updated as part of a file exchange process, wherein a number of entities can exchange current customer information with one another. The current information can be used to update the identification database 112. That is, at a desired time, such as at the end of the day for example, the entities can exchange current information for customers associated with a special community. The information can include, but is not limited to: telephone numbers, device identification information, IP address information, and other identification information that can be used to identify a user.

In an embodiment, the entities can exchange all pertinent information at the onset of the relationship and thereafter exchange a delta of changes, such as recent additions, changes, and/or deletions. In another embodiment, the identification database 112 can be updated in real-time by transferring or querying information from one or more external repositories (e.g. number portability database) that maintain up-to-date user communication information. For example, the identification database 112 can include information associated with changes to customer information, such as changes to a mobile phone number, changes to a landline number, changes to an e-mail address, changes to a different carrier/network etc. The identification database 112 can include a special identifier, such as a value of a specific database field for example, that can be used to identify whether a user's identification information is associated with a special community.

The identification database 112 can also comprise a number portability database which includes information to identify phone numbers that have been ported from one carrier to a different carrier for example. The number portability database can also include a special identifier that can be quickly and efficiently used (e.g. queried) to ascertain whether a particular number and/or user is associated with a special community. For example, a customer may have changed from one network or carrier to a different network or carrier, and the special identifier can be used to determine whether the different network or carrier should be rated as part of a special community. Thus, such a database can be queried to determine if a user's information (e.g. phone number, e-mail address, IP address, etc.) is associated with an associated carrier for rating and/or billing purposes. In an alternative embodiment, a third party can maintain the identification database 112 in order to ease the burden associated with maintaining a large amount of frequently changing data of the identification database 112.

As mentioned above, the first carrier 100 includes a rating application 114 that is configured to rate a communication event. The rating application 114 includes logic and is configured to use information, provided in part by using one or more databases, to determine whether a communication event should be specially rated or not and to provide rating information to a billing system 116. The rating application 114 can rate a communication event in real-time (e.g. at the time of the communication event) or at some desired time. For example, the rating application 114 can use gathered origination information, termination/destination information, date, time, duration, size (e.g. packet size), content, etc. to rate the communication event in real-time or as part of a batch process.

In an embodiment, the rating application 114 is configured to determine whether a communication event should be specially rated based in part on a determination of whether the communication event is associated with a special community. The rating application 114 can be configured as a software program that can be executed on a computing device, such as an application server for example, associated with the first carrier 100. Once the rating application 114 has determined if a communication is associated with a special community, the rating database 108 can be used to determine a specific charge to be applied to the communication event. As described above, each special community can have associated charges and/or rates that are applied a communication event that is associated with a special community.

The first carrier 100 also includes the billing system 116. In an embodiment, the billing system 116 includes a real-time billing component 116a and a post-pay billing component 116b. The billing system 116 receives information from the rating application 114 in order to issue bills to customers and/or to extract funds, but is not so limited. The real-time billing component 116a is configured to bill an account in real-time. The real-time billing component 116a is useful in situations wherein a user does not have good credit and there may be a risk that the customer would not make a timely payment.

Users who fall under real-time billing are typically required to make some type of deposit and/or maintain an amount of funds in an established account. They are provided an associated amount of time for communications, wherein the amount of time is associated with the amount of prepaid funds. The real-time billing component 116a can be used during a communication event. Information associated with the communication event is routed to the rating application 114 which rates the communication event and passes the rating information to the real-time billing component 116a.

The real-time billing component 116a can take appropriate action based on the rating information, such as applying a no charge to the communication event if the user is associated with a special community. For example, the real-time billing component 116a can be used when a user has originated or received a call. The call is routed to the rating application 114 which rates the call, and as soon as the call terminates, the rating application 114 passes the rating information to the real-time billing component 116a which then can decrement funds from the prepaid account.

The post-pay billing component 116b uses the rating information provided by the rating application 114 to bill a customer, such as by electronic billing or regular mail for example. The post-pay billing component 116b can be used for customers having established credit histories. The post-pay billing component 116b can run a batch event on a certain date which operates to determine what to bill a particular customer from a previous billing date to the current billing date for example. The rating application 114 can be used to rate communication events for the batch cycle, including determining whether any change of status has occurred since a previous billing date and/or cycle.

The first carrier 100 can maintain records of communication events for a particular billing period and the rating application 114 can be used to rate the records when it is time to bill. At that time, the rating information is passed on to the post-pay billing component 116b which prepares a bill based in part on the rating information and the bill is sent to the associated customer. As described herein, various informational databases can be used to determine how to rate and/or bill certain communication events. For example, the rating application 114 can use historical information, including changes of status, associated with a communication event to rate the event in a batch cycle with other communication events. The rating application can use the various databases to determine if a user status has changed and needs to be rated differently. For example, the rating application 114 can use an origination address, destination address and a timestamp to determine if the user and/or recipient were associated with a special community at the time of the communication event.

As further example, the rating application 114 may rate a call a certain way if a user was associated with one special community for part of a month and switched to a different community for the remainder. That is, the rating application 114 may rate the call differently if a similar call occurred (e.g. same time span, same recipient) but the user was now associated with a new special community. As described above, the post-pay billing component 116b can apply a special charge (e.g. free of charge) if the call occurred between users of a special community as determined by using the special identifier when rating a communication event. In alternative embodiment, each billing component can include an associated rating application, such as post-pay and real-time rating applications.

As described above, a number of disparate carriers and associated networks can join together to provide a special community. For example, users who qualify for free calling have bought the $59.95 wireless plan and a quad play bundle. Those who qualify for two cents a minute are the customers who bought three of the four elements of the quad play bundle and, they bought the $39.95 wireless plan. Thus, an eligibility determination can be used to determine if a user can be associated with a special community.

As shown in FIG. 1, there are a number of carriers up to the Nth carrier 102. The Nth carrier 102 includes similar features as those described in conjunction with the first carrier 100 and are not discussed in detail as above. With continuing reference to FIG. 1, the Nth carrier 102 includes an associated communication network 118. The communication network 118 can comprise any communication network capable of communicating information, including wired, wireless, and other communications.

The Nth carrier 102 also maintains a customer database 120. The customer database 120 is a repository for customer information associated with the Nth carrier 102. The customer information can include, but is not limited to: type of service plan(s) (voice, data, video, etc), service features, contact information, billing information, phone number(s), IP address, etc. The customer database 120 includes a number of customer data records (CDRs), wherein each CDR is associated with a customer of the Nth carrier 102 and contains information associated therewith.

In an embodiment, the customer database 120 includes a special identifier, such as a value of a specific database field for example, that can be used to identify whether a particular customer is associated with a special community. The special identifier can comprise a range of values, wherein each value can be associated with a distinct special community and/or rating. A first value can be associated with a first special community and/or rating, wherein customers associated with the first special community obtain certain benefits (e.g. a first distinct charge for a communication event) when communicating with others that are associated with the first special community. For example, if a customer belongs to the first special community and makes a mobile phone communication to another customer of a different network (or the same network) that also belongs to the first special community, then each customer will not be charged for the particular communication transaction (other than a monthly billing charge for the service). In other words, each customer will not be charged for the particular communication event since they each belong to the special community.

The Nth carrier 102 also maintains a rating database 122. The rating database 122 includes rating information associated with each service plan provided by the Nth carrier 102. The rating database 122 can include a number of rating tables for use in rating a communication event by a rating application 128. That is, the rating application 128 can access rating tables in the rating database 122 to ascertain how to rate a communication event. The rating tables of the rating database 122 can also include rating information (e.g. one or more special identifiers) for rating a communication event associated with a special community.

The Nth carrier 102 also maintains a communication event database 124. The communication event database 124 can comprise communication event information collected and/or associated with various devices of one or more communication networks. The communication event database 124 can include information such as, but not limited to: event origination information, event termination/destination information, date/time, duration, System ID, special identifier community, etc. The communication event database 124 can be accessed to determine information associated with a communication event, such as a call, data transfer, video download, etc. The rating application 128 can also use information of the communication event database 124 to rate a communication event.

In one embodiment, the Nth carrier 102 also maintains an identification database 126. The identification database 126 includes identification information and other knowledge associated with carriers/networks of interest, but is not so limited. As user information changes, the identification database 126 can be updated in real-time to include any changed information, such as whether a user has become a member of or left a special community for example. The rating application 128 can use the information contained in the identification database 126 to determine if a party to a communication event should be rated as part of a special community. In an embodiment, the identification database 126 includes a special identifier that can be used to identify whether a user's identification information is associated with a special community. In an alternative embodiment, a third party can maintain the identification database 126.

The rating application 128 includes logic and is configured to use information, provided in part by using one or more databases, to determine whether a communication event should be specially rated or not, and to provide rating information to a billing system 130. The rating application 128 can rate a communication event in real-time (e.g. at the time of the communication event) or at some desired time. For example, the rating application 114 can use gathered origination information, termination/destination information, date, time, duration, size (e.g. packet size), content, etc. to rate a communication event.

In an embodiment, the rating application 128 is configured to determine whether a communication event should be specially rated based in part on a determination of whether the communication event is associated with a special community. The rating application 128 can be configured as a software program that can be executed on a computing device, such as an application server for example, associated with the Nth carrier 102. Once the rating application 128 has determined if a communication is associated with a special community, the rating database 122 can be used to determine if a specific charge is to be applied to the communication event. As described above, each special community can have an associated charge for a communication event that is associated with each special community.

In an embodiment, the billing system 130 includes a real-time billing component 130a and a post-pay billing component 130b. The billing system 130 receives information from the rating application 128 in order to issue bills to customers and/or to extract funds. The real-time billing component 130a is configured to bill an account in real-time. The real-time billing component 130a can be used during a communication event. Information associated with the communication event is routed to the rating application 128 which rates the communication event and passes the rating information to the real-time billing component 130a. The real-time billing component 116a can take appropriate action based on the rating information, such as applying a no charge to the communication event if the user is associated with a special community.

The post-pay billing component 130b uses the rating information provided by the rating application 128 to bill a customer, such as by electronic billing or regular mail for example. The post-pay billing component 130b can run a batch event on a certain date which operates to determine what to bill a particular customer from a previous billing date to the current billing date. The rating application 128 can be used to rate communication events for the batch cycle, including determining whether any change of status has occurred since the previous billing date.

Figure 2:
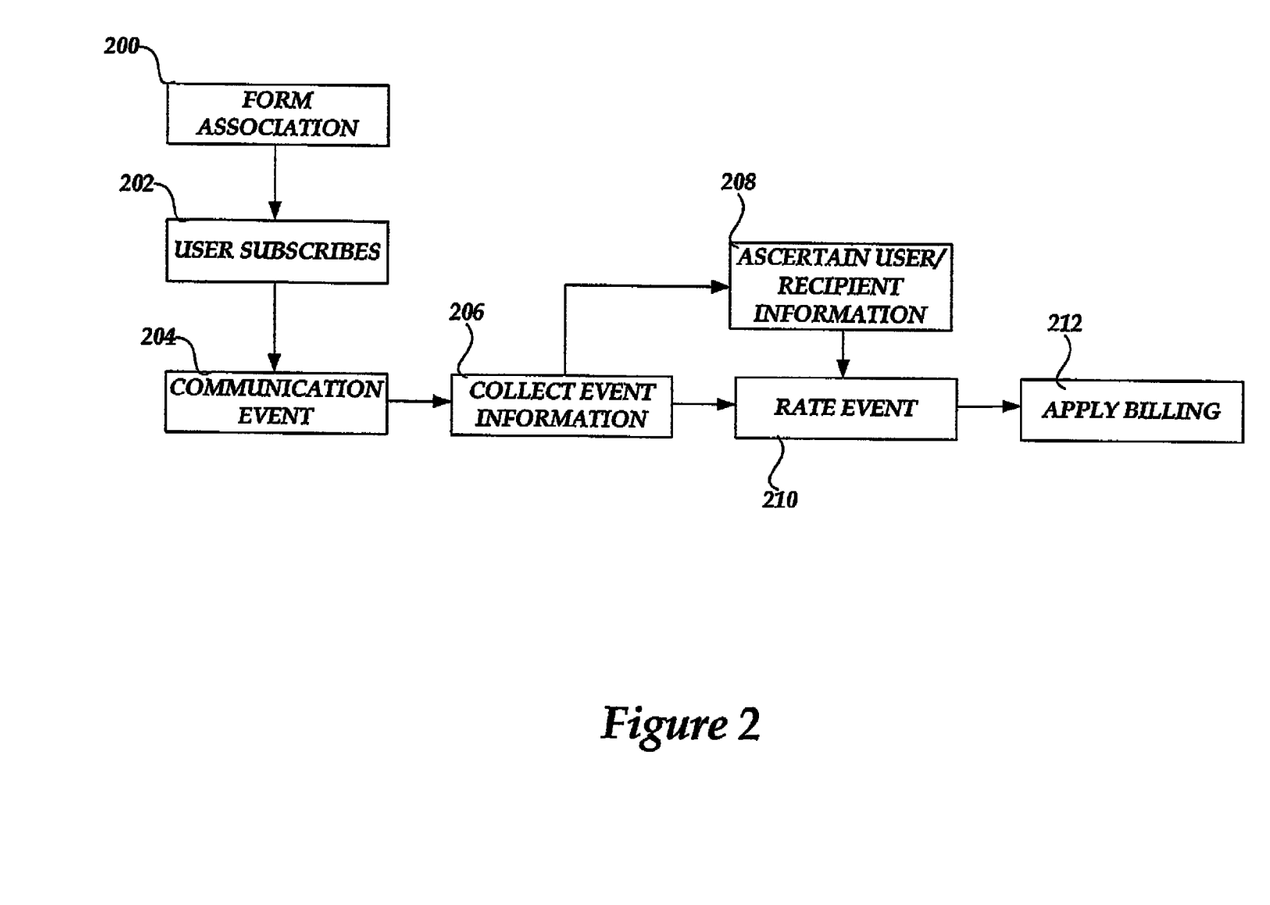
FIG. 2 is a flow diagram illustrating a process of rating and billing a communication event.

FIG. 2 is a flow diagram illustrating a process of rating and billing a communication event, under an embodiment. At 200, a number of carriers, networks, and/or other communication entities form an association, wherein the association can include defining a special community. The special community can offer special rates, charges, and/or other services to users who subscribe to the association. At 202, a user can subscribe to a special community of an association. A number of eligibility factors (e.g. type of service/plan, type of association, credit rating, etc.) can be used to determine whether a user is eligible to join a particular special community.

At 204, a user who has subscribed to an association uses a communication device to execute a communication event. For example, a user can use a handheld device to make a call, transmit data, view a video stream, etc. At 206, information associated with the communication event is collected by communication devices of the association. For example, gateways, switches, and/or other communication devices can collect information associated with the event. The information can then be stored in one or more storage devices, including one or more communication event databases.

At 208, information associated with the user and the recipient is ascertained. For example, a customer database can be queried by the rating application 114 or billing system 116 to determine the user's information and a Local Exchange Routing Guide (LERG) can be used to determine the network destination address associated with the recipient's information. The information associated with the user, recipient, and/or the communication event is then used by the rating application 114 to rate the particular communication event at 210. Once the rating application 114 has rated the communication event, the rating and other information associated with communication event is used by the billing system 116 at 212 to ascertain how the user should be billed. If the user and the recipient of the communication event both belong to a special community, the billing system 116 can apply special charges and/or rates when billing the user.

Figure 3:
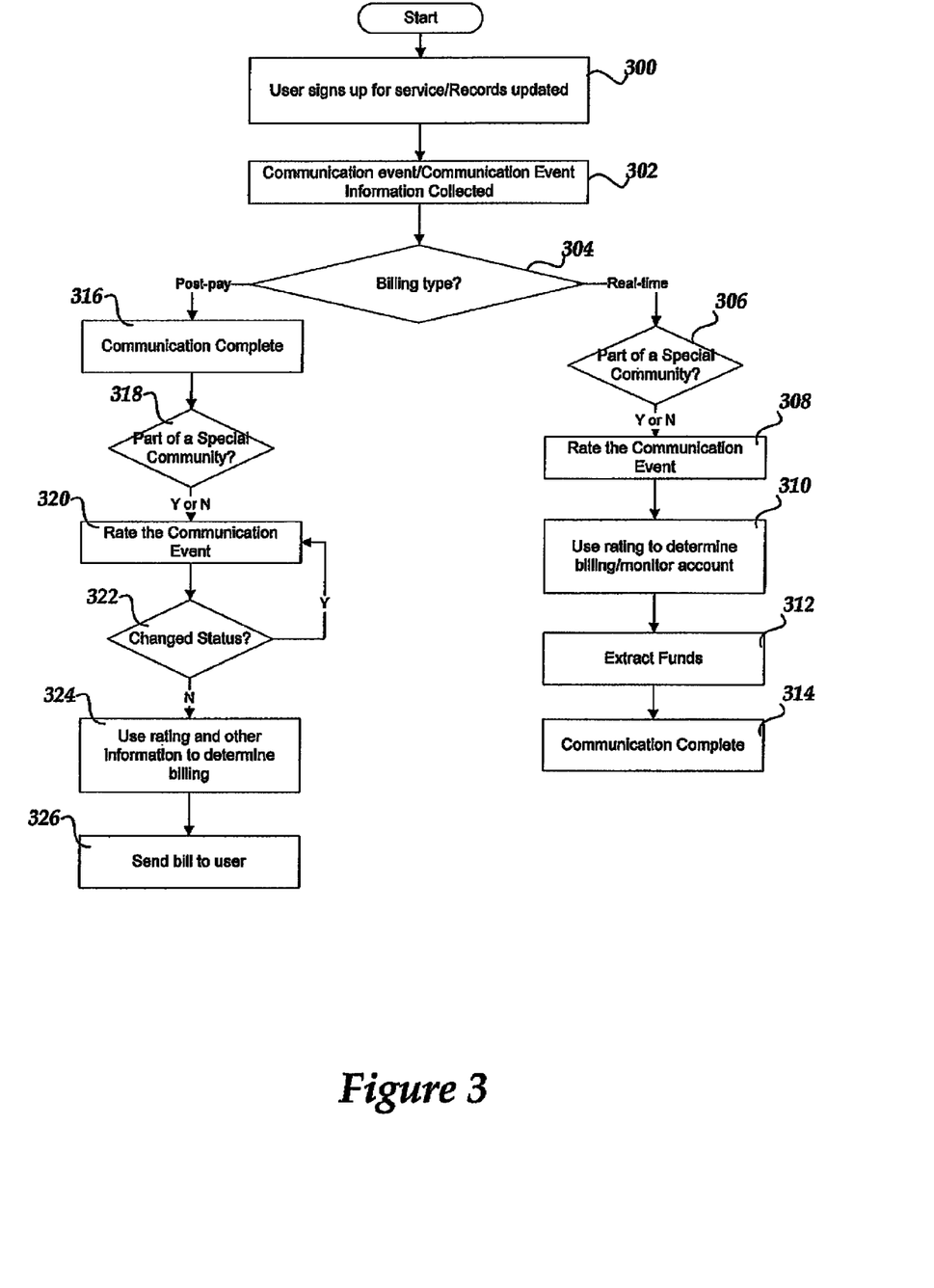
FIG. 3 is a flow diagram illustrating a process of rating and billing a communication event.

FIG. 3 is a flow diagram illustrating a process of rating and billing a communication event, under an embodiment. At 300, a user signs up for service, such as for a communication service. The user can choose and/or elect to be included in one or more special communities. As described above, each special community can provide a number of communication services and/or benefits to users associated with such a community. For example, a user can subscribe to an association of carriers and/or service providers, and thereby enjoy a number of benefits, including various packages, plans, rates, security, coverage, and/or charges. Once a user has signed up for a service and/or special community, user, device, service, and other information can be stored and maintained by the service provider and/or other entity, such as by updating database records for example.

In one embodiment, a special identifier can be associated with the user, wherein the special identifier can be used in rating a communication event associated with the user. The special identifier can be quickly and efficiently updated if a user's status changes. Moreover, the special identifier updates can be quickly and efficiently transferred and used to update other repositories which track the special identifier. At 302, a communication event transpires. For example, a user may originate or be the recipient of some type of a communication. Information associated with the communication event can be collected, stored, and maintained by the service provider and/or other entity and used to rate and bill the user.

Based on the billing type associated with the user, at 304 the flow branches to a post-pay path or a real-time billing path. If the billing type is real-time billing, at 306 it is determined whether the user is part of a special community. In an embodiment, a component, such as the rating application 114 for example, can use a special identifier to determine if the communication event should be specially charged, such as a zero or other charge. In one embodiment, the special identifier can take on a number of values, wherein each value identifies a particular special community, charge, and/or rate. At 308, the communication event is rated such as by the rating application 114 for example. At 310, the rating and other information associated with the user and/or communication event is used by the billing system 116 to determine how to bill the particular communication event. At 312, the billing system 116 can extract funds for the communication event. The communication event ends at 314.

On the other hand, if the billing type is post-pay billing, at 316 the communication ends. At 318, it is determined whether the user is part of a special community by the rating application 114. At 320, the communication event is rated by the rating application 114. In an embodiment, a component, such as the rating application 114 and/or billing system 116 for example, can use a special identifier to determine if the communication event should be specially charged, such as a zero or other charge. At 322, one or more databases can be queried to determine whether the user's status has changed. For example, a user can sign up for additional services associated with one or more special communities. Or, a user may leave one or more special communities for example.

If the user's status has changed, the communication event is rated by the rating application 114 in accordance with the change of status at 320. If the user's status has not changed, at 324, the rating and other information associated with the user and/or communication event is used by the rating application 114 and/or billing system 116 to determine how to bill the particular communication event. At 326, the user can be billed by the billing system 116 for the communication event. In an alternative embodiment, the rating of the communication event can transpire while the communication event is in progress.

In an embodiment, a communication event can be rated for billing purposes, wherein the rating includes determining whether the communication event should be specially rated. Origination and/or destination information associated with the communication event can be used in part to determine whether users are included in a special community. The communication event can be specially rated and billed if a user has subscribed to a special community. As described herein, a number of communication carriers can be associated in such a manner to provide a special community that a user can enjoy various services offered by the combination. The combination of communication carriers can provide a special community plan to a user who has signed up and/or is eligible for the special community plan. Users who have signed up and/or are eligible for the special community plan can be provided with a special charge and/or other benefits when communicating with other users associated with the special community.

While the Figures depict various components and features, the functionality and components themselves can be implemented to obtain a desired result. That is, while a number of distinct components are illustrated in FIG. 1, the various components can be combined and/or interchanged to provide a desired implementation and/or functionality. For example, a number of database components are depicted in FIG. 1 which can be implemented as one or more serving computers, such as one or more structured query language (SQL) servers. Moreover, the rating and billing components can be implemented as a single serving computer or application. As further example, FIGS. 2 and 3 each depict a number of logical steps of a flow diagram. Additional steps can be added to the flow or steps can be removed from the flow. Additionally, the steps are not required to be executed in a particular order and can be rearranged to obtain a desired result.

It will be apparent to those skilled in the art that various modifications or variations may be made in the present invention without departing from the scope or spirit of the invention. Other embodiments of the invention will be apparent to those skilled in the art from consideration of the specification and practice of the invention disclosed herein.

What is claimed:

1. A communication apparatus for implementing a rating application for rating a communication event, comprising:
 a processor; and
 a computer-readable medium storing a plurality of instructions which, when executed by the processor, cause the processor to perform operations, the operations comprising:
  rating the communication event, wherein the rating application uses information from a database and information from a communication event database to perform the rating of the communication event, wherein the database includes information associated with a community of subscribers, wherein the database includes user information and an identifier associated with the community of subscribers, wherein the community of subscribers is defined by a plurality of communication carriers, wherein the communication event database includes information associated with the communication event, wherein the communication event is associated with user communications.

2. The communication apparatus of claim 1, wherein the rating application is used to rate the communication event based on a value associated with the identifier.

3. The communication apparatus of claim 1, wherein the rating application is used to rate the communication event based on a value associated with the identifier, wherein the value represents a community rating associated with a particular community of subscribers defined by a particular group of communication carriers of the plurality of communication carriers.

4. The communication apparatus of claim 1, wherein the rating application is used to rate the communication event based in part on the identifier, wherein the identifier represents a charge for the communication event.

5. The communication apparatus of claim 4, wherein the rating application is used to rate the communication event based in part on the identifier, wherein the identifier represents a zero charge when the communication event is associated with the community of subscribers, and the zero charge is applied when billing for the communication event.

6. The communication apparatus of claim 1, further comprising:
 billing for the communication event based in part on the rating provided by the rating application.

7. The communication apparatus of claim 6, wherein the billing comprises a real-time billing.

8. The communication apparatus of claim 6, wherein the billing comprises a post-pay billing.

9. The communication apparatus of claim 1, further comprising:

determining when a status of a user has changed via an identifier database including information associated with users of a number of communication networks.

10. The communication apparatus of claim 9, wherein the determining when the status of the user has changed is performed in accordance with the identifier database that is maintained by a service provider.

11. The communication apparatus of claim 9, wherein the rating application uses the identifier database before rating the communication event.

12. A communication method, comprising:
receiving, via a processor, a communication event associated with a user, wherein the user has a subscription to a community of subscribers defined by a plurality of communication carriers; and
rating, via the processor, the communication event to provide a rated communication event, wherein the rating is based in part on a determination of whether the communication event is associated with the community of subscribers.

13. The communication method of claim 12, wherein the rating comprises querying a database to assess an identifier associated with the communication event and using the identifier to rate the communication event.

14. The communication method of claim 12, further comprising:
assigning a value to an identifier, wherein each value of the identifier identifies a particular community of subscribers; and
wherein the rating the communication event is performed by evaluating the value of the identifier associated with the communication event.

15. The communication method of claim 12, further comprising:
billing the communication event, wherein the billing is based in part on the rating of the communication event.

16. The communication method of claim 12, further comprising:
rating the communication event after a period of time relative to the communication event.

17. A computer readable medium storing a plurality of instructions which, when executed by a processor, cause the processor to perform operations for rating a communication event, the operations comprising:
determining whether the communication event is associated with a community of subscribers by evaluating an identifier that is assigned to the community of subscribers, wherein the community of subscribers is defined by a plurality of communication carriers; and
rating the communication event when the communication event is associated with the community of subscribers.

18. The computer-readable medium of claim 17, further comprising:
billing a subscriber for the communication event, wherein the billing includes using the rating of the communication event to determine a charge for the communication event.

19. The computer-readable medium of claim 17, further comprising:
determining whether the communication event is associated with a different community of subscribers.

20. The computer-readable medium of claim 19, wherein the determining whether the communication event is associated with the different community of subscribers is performed by querying a database maintained by a third party.

* * * * *